UNITED STATES PATENT OFFICE.

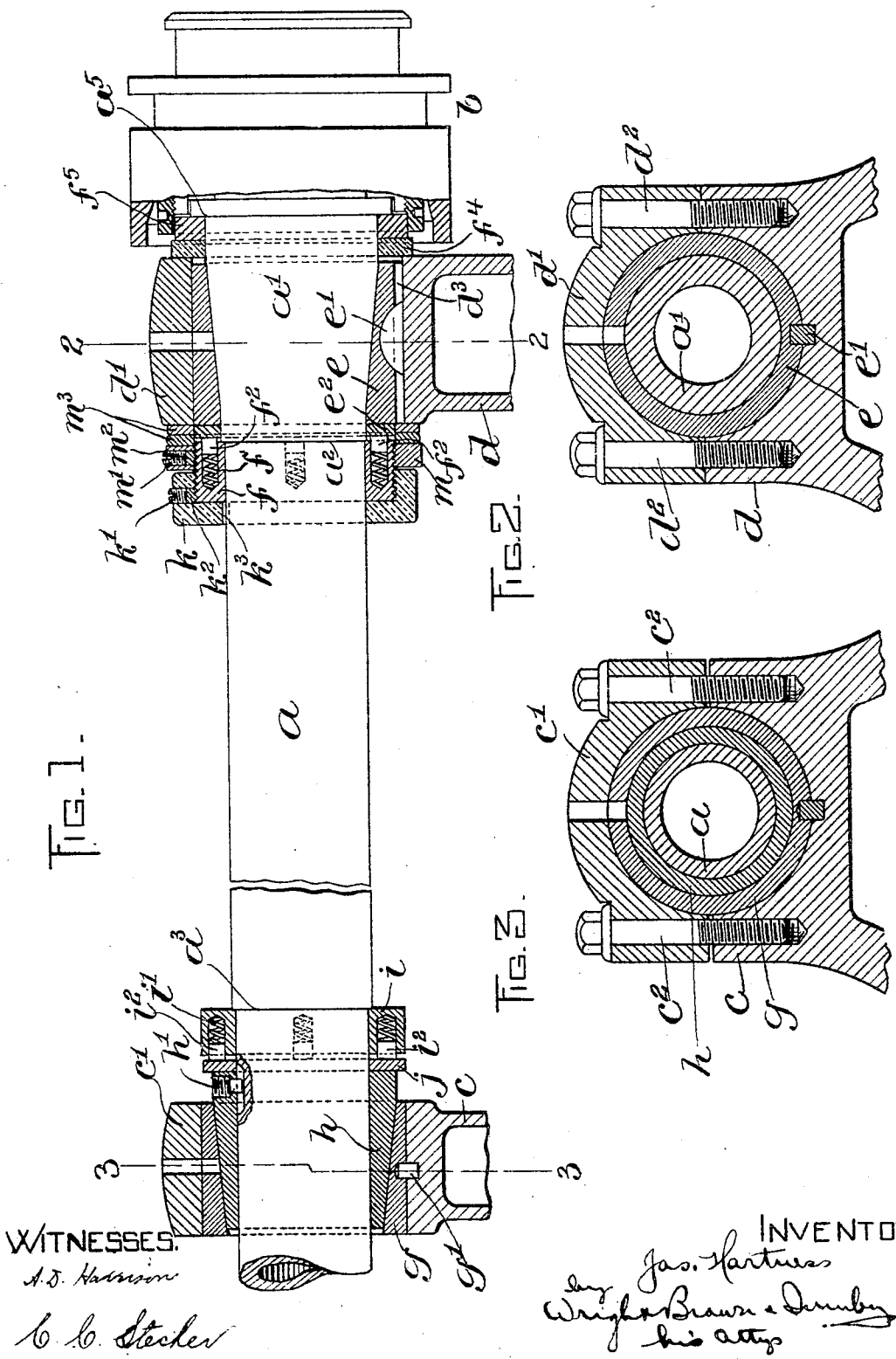

JAMES HARTNESS, OF SPRINGFIELD, VERMONT.

COMPENSATING BEARING.

No. 800,570.  Specification of Letters Patent.  Patented Sept. 26, 1905.

Application filed April 13, 1903. Serial No. 152,353.

*To all whom it may concern:*

Be it known that I, JAMES HARTNESS, of Springfield, in the county of Windsor and State of Vermont, have invented certain new and useful Improvements in Compensating Bearings, of which the following is a specification.

This invention has for its object to provide a bearing for rotating bodies which automatically compensates for wear.

On the accompanying drawings, Figure 1 represents the spindle of a lathe with the bearings therefor constructed according to the invention. Fig. 2 represents a section on the line 2 2 of Fig. 1. Fig. 3 represents a section on the line 3 3 of Fig. 1.

Referring to the drawings, $a$ indicates a rotary member, which is illustrated in the form of a hollow lathe-spindle equipped at one end with a chuck, (indicated as a whole at $b$.)

In metal-working machinery it is desirable that the spindle or rotating member should be held firmly against longitudinal movement to insure the accuracy of the operations on the work, and at the same time it is equally desirable that the spindle should be held from "chattering" or working loose in its bearings. Consequently according to the present invention the bearings are so constructed that as they become worn they are automatically adjusted to compensate for wear.

The standards or supports for the spindle are indicated on the drawings at $c$ $d$, respectively. These may form a portion of the headstock of the lathe or they may be constructed in any suitable way.

As illustrated, each bearing is equipped with a cap $c'$ $d'$, as the case may be, held in place by screws $c^2$ $d^2$. The spindle is provided with a portion $a'$, which tapers inwardly from the chuck end and which terminates with a shoulder $a^2$. This frusto-conical or tapering portion of the spindle is mounted in a bushing $e$, which is internally tapering, as shown, to accurately fit thereon. It is provided with a key $e'$, adapted to slide in a groove $d^3$ in the standard $d$, so that while the bushing is held against rotation it is nevertheless adapted to be moved toward the chuck. Between a shoulder or flange $a^5$ on the spindle and the bracket or standard $d$ there are thrust-collars $f^4$ $f^5$, by which the chuck is held against movement when it experiences the thrust of the tool upon the work. That portion of the spindle which is between the shoulder $a^2$ and the frusto-conical portion is cylindrical, as shown, for the reception of a collar or washer $e^2$, which bears against the end of the bushing $e$.

Upon the spindle $a$ is a sleeve or collar $f$, which is rigidly secured in any suitable way to the spindle to bear against the shoulder $a^2$. It may be secured in place by a screw taking into a socket in the spindle or by any other suitable means, such as hereinafter described. This sleeve or collar is formed with sockets parallel to its axis, in which are placed springs $f'$ and pins $f^2$, the pins bearing against the washer $e^2$, and therefore tending to force the bushing $e$ toward the chuck. With this construction it will be apparent that as the shaft or the bushing $e$ becomes worn by their frictional engagement the springs $f'$ will force the bushing longitudinally toward the chuck, so as to compensate for the wear. This automatic compensation may be effected, however, for the chuck end of the spindle by the same appliances which are employed for the opposite or rear end thereof and which will now be described.

Screwed on the sleeve $f$ there is a collar $k$, which may be secured in place by a pin $k'$ and a grooved block $k^2$. This collar is keyed to the shaft, as indicated at $k^3$. The sleeve $f$ is likewise provided with another collar $m$, which may be locked in place by a screw $m'$ and grooved block $m^2$. Between this collar and the bearing $d$ there are thrust-washers $m^3$. By screwing up the collar $m$ the spindle may be held against movement in either direction with relation to the bearing $d$.

The standard or support $c$ is provided with a tapering aperture. The aperture may be formed directly in the standard or it may be formed in a bushing $g$, secured therein by the pin $g'$, so as to hold it against longitudinal and rotative movement. The bush $g$ thus becomes a part, as it were, of the support $c$. Within the tapering aperture is placed a bushing $h$, which is externally tapering, so as to fit accurately therein. This bushing is provided with a screw-pin $h'$, extending into a slot in the periphery of the spindle and extending longitudinally thereof. Secured upon the spindle and bearing against a shoulder $a^3$ there is a sleeve or collar $i$, formed with sockets parallel to its axis for the reception of springs $i'$ and pins $i^2$. These pins bear against a washer $j$, which is inserted between the collar and the end of the bushing $h$. As the two bushings $h$ and $g$ become worn by frictional contact the bushing $h$ is moved longitudinally away from the chuck end of the spindle, so as to compensate for the wear. By virtue of this construction the spindle is prevented from all lateral vibration or movement and at the same time is rigidly held against longitudinal movement.

It is apparent that with each form of bearing for the two ends of the spindle there are interposed between the spindle and the standard or support two complemental members in wedging engagement, of which one is longitudinally movable with respect to the other. In the bearing for the chuck end of the spindle the bushing *e* forms one of the said members, and the tapering portion of the spindle forms the other of said members. It is true that the tapering portion of the spindle is in the form indicated an integral part of the spindle; but it might be formed separately and secured thereto, just as in the case with the bearing for the rear end of the spindle the bushing *g* might be made an integral part of the bracket or support *c*. In each case there is likewise an abutment—to wit, the sleeve or collar *i* or the sleeve or collar *f* and springs interposed between the abutment and the movable wedging member for moving said member relatively to its complemental member.

Having thus explained the nature of the invention and described a way of constructing and using the same, although without attempting to set forth all of the forms in which it may be made or all of the modes of its use, I declare that what I claim is—

1. The combination of a rotating member, a support therefor, a compensating device inserted between said member and said support, means yieldingly pressing against said compensating device to cause it to compensate for wear of said member, and means for holding said member and support against relative axial movement.

2. The combination with a rotary member, of a support therefor, relatively to which the rotary member is held longitudinally immovable a bushing interposed between the said member and said support, said bushing and said member having complemental tapering surfaces, and means for automatically moving said bushing longitudinally between said rotary member and said support to compensate for wear.

3. The combination with a rotary member having a tapering portion, of a support, a bushing inserted between said support and said member and having internal tapering surfaces complemental to the tapering portion of the rotating member, means for connecting the said bushing to the said support to hold it from rotation relatively thereto, and to permit it to slide longitudinally therein, an abutment rigidly secured to the shaft, and springs interposed between the said bushing and the said abutment to advance said bushing along the said member to compensate for wear.

4. The combination with two elements, to wit, the rotating member and a support relatively to which it is longitudinally stationary, of a bushing interposed between said elements and having a tapering portion in engagement with the complemental tapering portion of one of said elements, and means for yieldingly and automatically wedging said bushing between said elements to compensate for wear.

5. The combination with two elements, to wit: a support and a shaft, one of which elements is tapering, of means for holding said shaft against longitudinal movement relatively to the support, a tapering bushing inserted between said shaft and said support, an abutment on said shaft, and springs interposed between said abutment and the thicker end of said bushing.

6. The combination with two elements, to wit: a support and a shaft, one of which elements is tapering, of means for holding said shaft against longitudinal movement relatively to the support, a tapering bushing inserted between said shaft and said support, an abutment on said shaft having sockets, springs and pins in said sockets, and a washer interposed between the ends of said pins and the thicker end of said bushing.

In testimony whereof I have affixed my signature in presence of two witnesses.

JAMES HARTNESS.

Witnesses:
J. W. BENNETT,
AARON M. BAKER.